(12) United States Patent
Carvalho et al.

(10) Patent No.: US 8,549,909 B2
(45) Date of Patent: Oct. 8, 2013

(54) VESSEL PROBE CONNECTOR WITH SOLID DIELECTRIC THEREIN

(75) Inventors: Carlos E. Carvalho, Tyngsborough, MA (US); George Ki, Windham, NH (US)

(73) Assignee: Meggitt (Orange County), Inc., Irvine, CA (US)

( * ) Notice: Subject to any disclaimer, the term of this patent is extended or adjusted under 35 U.S.C. 154(b) by 345 days.

(21) Appl. No.: 13/086,928

(22) Filed: Apr. 14, 2011

(65) Prior Publication Data
US 2011/0241698 A1    Oct. 6, 2011

Related U.S. Application Data

(63) Continuation-in-part of application No. 12/243,511, filed on Oct. 1, 2008.

(60) Provisional application No. 60/976,615, filed on Oct. 1, 2007.

(51) Int. Cl.
*G01F 23/00* (2006.01)

(52) U.S. Cl.
USPC ............................................. 73/290 V

(58) Field of Classification Search
USPC ................. 73/290 V; 439/578, 582
See application file for complete search history.

(56) References Cited

U.S. PATENT DOCUMENTS

| | | | |
|---|---|---|---|
| 3,246,180 A | 4/1966 | Keeney, Jr. | |
| 3,474,337 A * | 10/1969 | Petrick | ........................... 324/644 |
| 3,874,237 A | 4/1975 | Zwarts | |
| 4,161,704 A | 7/1979 | Schafer | |
| 4,596,144 A | 6/1986 | Panton et al. | |
| 4,786,857 A | 11/1988 | Mohr et al. | |
| 4,881,912 A * | 11/1989 | Thommen et al. | ............ 439/585 |
| 5,457,990 A | 10/1995 | Oswald et al. | |
| 5,610,611 A | 3/1997 | McEwan | |

(Continued)

FOREIGN PATENT DOCUMENTS

| DE | 102004032965 A1 | 2/2006 |
|---|---|---|
| EP | 0042186 A1 | 12/1981 |

(Continued)

OTHER PUBLICATIONS

A. Cataldo, A. Lay-Ekuakille, C. Decarlo, Remote Sensing of Liquid Characteristics Using time Domain Reflectometry, Earth Observing Systems VII, Proceedings of APIE vol. 4814 (2002) p. 465-473 AGM Industries S.p.A., Martignnano Lecce, Italy.

(Continued)

*Primary Examiner* — Hezron E Williams
*Assistant Examiner* — Nathaniel Kolb
(74) *Attorney, Agent, or Firm* — Peter A. Nieves; Sheehan Phinney Bass + Green PA (57) ABSTRACT

A modular TDR probe assembly is presented. The probe assembly includes a first section with a central conductor and an outer conductor having a first impedance, and a second section with a central conductor and an outer conductor having a second impedance. An impedance matching elbow joins the first section and the second section. The elbow contains a solid dielectric insert with a bore passing through it housing a terminal pin that conveys electrical signals between the center conductor of the first section and the center conductor of the second section.

18 Claims, 8 Drawing Sheets

(56) References Cited

U.S. PATENT DOCUMENTS

| | | |
|---|---|---|
| 5,734,346 A | 3/1998 | Richardson |
| 5,827,985 A | 10/1998 | Grieger et al. |
| 5,841,666 A | 11/1998 | Perdue et al. |
| 5,943,908 A | 8/1999 | Innes et al. |
| 5,973,637 A | 10/1999 | Perdue et al. |
| 5,979,233 A * | 11/1999 | Johnson .................. 73/149 |
| 6,078,280 A | 6/2000 | Perdue et al. |
| 6,138,508 A | 10/2000 | Hannan et al. |
| 6,232,910 B1 | 5/2001 | Bell et al. |
| 6,281,801 B1 | 8/2001 | Cherry et al. |
| 6,285,538 B1 | 9/2001 | Krahn |
| 6,297,969 B1 | 10/2001 | Mottahed |
| 6,504,793 B2 | 1/2003 | Fuenfgeld |
| 6,556,511 B1 | 4/2003 | Welke |
| 6,558,172 B2 * | 5/2003 | Kanagawa ............... 439/98 |
| 6,559,657 B1 | 5/2003 | McCarthy et al. |
| 6,626,038 B1 | 9/2003 | Carsella et al. |
| 6,640,629 B2 | 11/2003 | Carsella et al. |
| 6,644,114 B1 * | 11/2003 | McEwan ................. 73/290 R |
| 6,650,280 B2 | 11/2003 | Arndt et al. |
| 6,690,320 B2 | 2/2004 | Benway et al. |
| 6,701,783 B2 | 3/2004 | Fehrenbach et al. |
| 6,906,662 B2 | 6/2005 | Faust et al. |
| 7,012,437 B2 | 3/2006 | Klofer |
| 7,068,051 B2 | 6/2006 | Anderson |
| 7,162,922 B2 | 1/2007 | Freger et al. |
| 7,165,450 B2 | 1/2007 | Jamnia et al. |
| 7,918,133 B2 | 4/2011 | Volpe et al. |
| 2001/0035048 A1 | 11/2001 | Gualtieri |
| 2002/0101373 A1 | 8/2002 | Arndt et al. |
| 2002/0155755 A1* | 10/2002 | Yamane .................. 439/582 |
| 2004/0007061 A1 | 1/2004 | Forgue |
| 2004/0027137 A1 | 2/2004 | Sherrard |
| 2005/0192727 A1 | 9/2005 | Shostak et al. |
| 2006/0225499 A1 | 10/2006 | Gravel et al. |
| 2007/0081617 A1 | 4/2007 | Fudge |
| 2007/0204689 A1 | 9/2007 | Bostrom |
| 2009/0186522 A1* | 7/2009 | Henningsen ............. 439/582 |
| 2009/0235737 A1 | 9/2009 | Lavon |
| 2010/0153029 A1 | 6/2010 | Miskell et al. |
| 2011/0209543 A1 | 9/2011 | Miskell et al. |
| 2011/0282599 A1 | 11/2011 | Lavon et al. |

FOREIGN PATENT DOCUMENTS

| | | |
|---|---|---|
| EP | 0473082 A | 3/1992 |
| EP | 2012098 A1 | 1/2009 |
| EP | 2198252 A1 | 6/2010 |
| GB | 2466162 A | 6/2010 |
| JP | 10511181 A | 10/1998 |
| JP | 11248518 | 9/1999 |
| JP | 2004045380 | 2/2004 |
| RU | 2249796 C1 | 4/2005 |
| RU | 2289795 C1 | 12/2006 |
| WO | WO9619715 A | 6/1996 |
| WO | WO9926080 A | 5/1999 |
| WO | WO 01/63219 A2 | 8/2001 |
| WO | WO02/25227 | 3/2002 |
| WO | WO 02/25277 A1 | 3/2002 |
| WO | WO2009046103 A | 4/2009 |

OTHER PUBLICATIONS

Azevedo, Stephen and McEwan, Thomas; Micropower Impulse Radar; Science & Technology Review Jan./Feb. 1996, pp. 17-29.

* cited by examiner

VESSEL PROBE CONNECTOR WITH SOLID DIELECTRIC THEREIN

CROSS-REFERENCE TO RELATED APPLICATIONS

This application is a continuation-in-part of, and claims priority to, copending U.S. nonprovisional patent application entitled "System and Method for Accurately Measuring Fluid Level in a Tank," having Ser. No. 12/243,511, filed Oct. 1, 2008, which claims priority to U.S. provisional application having Ser. No. 60/976,615, filed Oct. 1, 2007, each of which are hereby incorporated herein by reference in their entirety.

FIELD OF THE INVENTION

The present invention is generally related fluid level detection, and more particularly is related to a time domain reflectometric probe.

BACKGROUND OF THE INVENTION

A common problem in many different fields is needing to know the properties of a material within an enclosed vessel. Such properties may include, for example, the height of a liquid in a tank. For example, where an air space is formed above the surface of liquid fuel present in the fuel tank of an automobile or airplane, knowledge of the shape of the tank and the height of the air-liquid interface from the tank bottom will allow one to calculate the amount of remaining fuel.

Where a plurality of stratifying liquids are present within a tank, it may furthermore be desired to know the height of each stratified liquid layer. For example, where water is mixed with hydrocarbon fuel intentionally, such as when seawater is used as ballast in oil tankers; or unintentionally, such as when water is present in a vehicle fuel tank or such as when groundwater seeps into tanks for fuel pumps at filling stations, it may be desired to know the height of fuel layer(s) as distinct from nonfuel layer(s) for accurate determination of remaining fuel.

Time domain reflectometry (TDR) applies radar techniques to transmission line theory to detect the location of impedance transitions or discontinuities at interfaces between different layers of materials. In TDR, an interrogation pulse transmitted from a transmitter is reflected from such an impedance discontinuity, and the reflected pulse is received by a receiver. It is possible to calculate the distance (range) to the impedance discontinuity that caused the reflection from the observed round-trip propagation time of the interrogation pulse.

Figure 1:
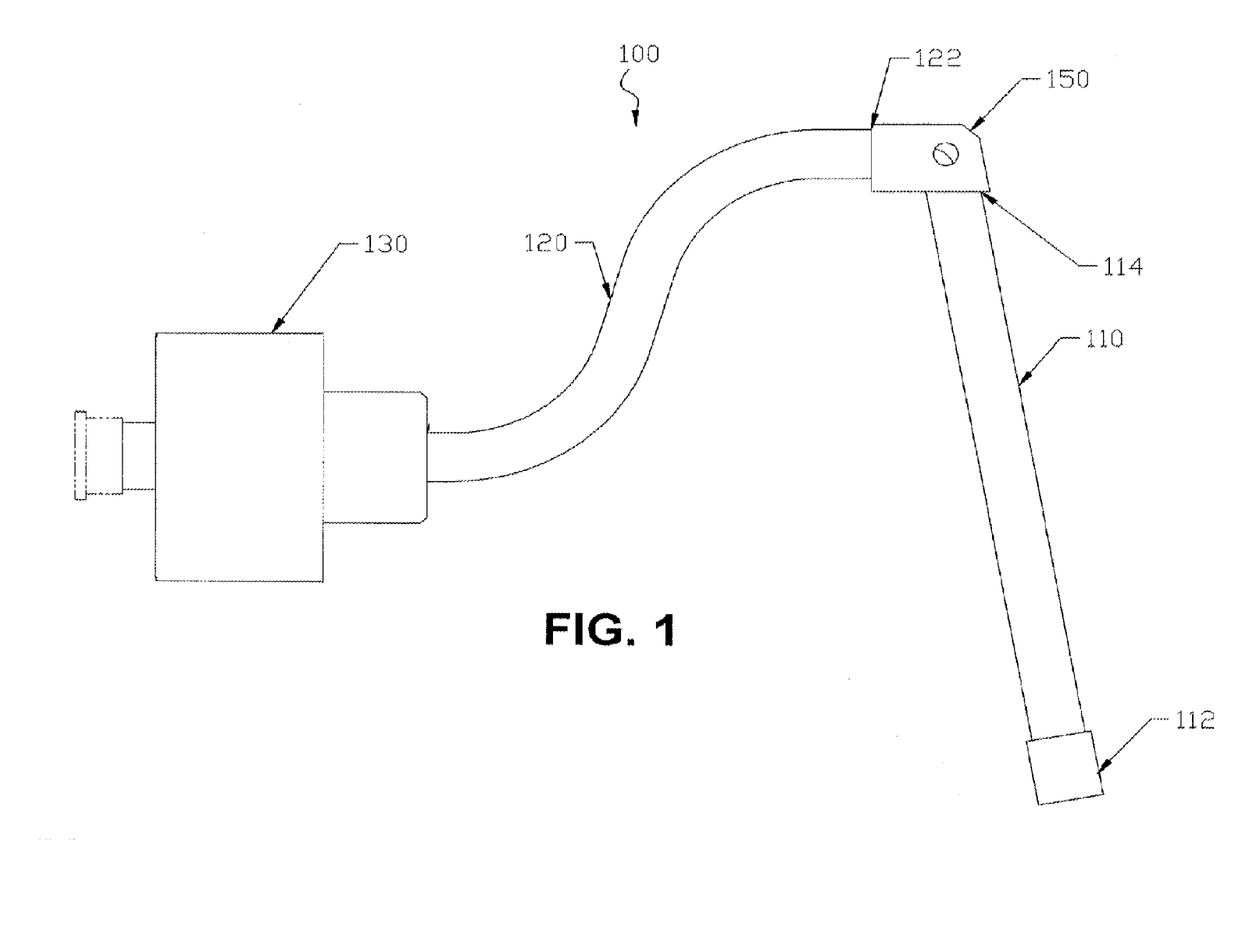
FIG. 1 is a schematic diagram of a TDR probe having a dielectric filled arm connecting the sensor and the elongated portion.

FIG. 1 is a schematic diagram illustrating a probe 100 as disclosed in copending U.S. nonprovisional patent application entitled "System and Method for Accurately Measuring Fluid Level in a Tank," having Ser. No. 12/243,511, filed Oct. 1, 2008. As is shown by FIG. 1, the probe 100 contains an elongated portion 110, a shaped arm 120, and a sensor 130. The elongated portion 110 is a coaxial tube having a hollow center. The elongated portion 110 is shaped and lengthened to allow for positioning within a fuel tank, wherein a distal end 112 of the elongated portion 110 extends toward a bottom of the fuel tank, in which the elongated portion 110 may be positioned. Having a hollow elongated portion 110 allows fluid to enter the elongated portion 110, via the distal end 112, into the hollow portion to enable fluid level determination.

A proximate end 114 of the elongated portion 110 joins a distal end 122 of the shaped arm 120. The connection between the elongated portion 110 and the shaped arm 120 is provided in a manner so as to allow the combination of the shaped arm 120 and the elongated portion 110 to create a waveguide for an electromagnetic pulse provided by the sensor 130. In addition, the combination of the elongated portion 110 and the shaped arm 120 provide a coaxial waveguide.

The shaped arm 120 may be filled with a dielectric such as Teflon®. The Teflon® fill is a solid dielectric. Use of a Teflon® fill serves at least two purposes. First, the Teflon® fill provides impedance matching, second, the Teflon® provides a means to prevent fluid ingression to a non-gauging portion of the probe 100, thereby eliminating unwanted reflections due to multiple fluid levels inside of the probe 100.

In accordance with probe 100, an interrogation signal is sent by the sensor 130 into a transmission line, wherein the transmission line includes the combination of the shaped arm 120, the elongated portion 110, and beyond the distal end 112 of the elongated portion 110. The transmission line has three sections. A first section of the transmission line is from an excitation source, such as the sensor 130, to a top of the probe 100, also referred to as the distal end 122 of the shaped arm 120 (also referred to as the beginning of the gauge-able area). A second section of the transmission line is from the top of the probe 100 (the distal end 122 of the shaped arm 120) to a bottom of the probe 100, also referred to as the distal end 112 of the elongated portion 110. The second section of the transmission line is also referred to as the gauge-able area. A third section of the transmission line is from the bottom of the probe 100 to the end of a transmission line that runs past the end, or distal portion 112, of the gauge-able area.

As discussed above, a TDR system may have a sensor unit (transmitter/receiver), a probe, and one or more connecting elements, such as an arm. The connecting elements may be, for example, a coaxial cable, or a coaxial waveguide. Reflections may occur unless the impedance of the arm is matched with the sensor and the probe. For example, the sensor may have an impedance of 50 ohms, and the probe may have an impedance of 86 ohms. Such impedance matching has been accomplished by filling the waveguide with a dielectric material with a known dielectric constant, for example, Teflon®. However, a dielectric filled waveguide connector may be relatively expensive compared with, for example, a coaxial cable. Therefore, it is desirable to provide a modular TDR system with low cost interchangeable connecting components.

One technical challenge involved with a modular TDR system is connecting modular components in such a way as to minimize signal loss while transmitting the interrogation pulse between the sensor and the probe. For example, if there is a signal discontinuity or impedance mismatch at the connection between successive modular components, the connection may generate unwanted reflections, and similarly, absorb or divert energy from the interrogation pulse before it reaches the target medium. Such an energy loss may be problematic, both for decreasing the signal to noise ratio of the interrogation pulse as reflected off the target medium, and for obscuring reflections from the gauge-able area with reflections outside the gauge-able area.

Signal discontinuities or reflection points along a transmission line may also occur where the transmission line is crimped or bent at a sharp angle, for example, an angle greater than 45 degrees. Even so, there are applications where it is advantageous for the TDR signal to traverse a path that takes sharp turns. In aerospace applications of TDR, where components may by necessity be constrained to fit within the aerodynamic boundaries of the vehicle, it may be advantageous to have the probe section attach to a connector section at a relatively high angle of incidence, for example, in the range of 45 degrees to 135 degrees. Such an angled connector is referred to herein as an elbow.

In aerospace applications, it may be particularly important for a TDR fuel probe to span the full height of a fuel tank. Therefore, the gauge-able region of the probe should begin at the very top of the tank and extend nearly to the bottom. Since in some application, the fuel tank extends to the very edge of the vehicle, extending the probe to the maximum height requires a probe connection at the end of a gauge-able area to be at a high angle of incidence. Therefore, it would be advantageous to connect the probe to the pulse signal chain at the very top of the tank, while minimizing unwanted reflections usually associated with such a high angle of incidence.

TDR may be used in applications where the material being monitored is inflammable, for example in fuel tanks. Inflammable material may be ignited by electromagnetic energy arcing across the gap ("spark gap") between two conductors, such as the center and outer conductor of a coaxial wave guide, creating a spark. Therefore, care must be taken to ensure that a high energy electromagnetic signal traversing the TDR interrogation pulse signal path does not ignite the inflammable material. For example, energy from lightning striking a vehicle may be conducted along the TDR signal path into the fuel tank and arc across the gap between the conductors, potentially igniting vapor in the fuel tank.

Non impedance matching elbow connectors or joints are known in coaxial cabling systems. However, while such prior art elbows allow the signal to be diverted at a high angle of incidence, they do not provide for impedance matching or adequate spark gaps for TDR purposes. In addition, positioning such a connector at the top of a probe would effectively shorten the measuring range of the probe, as the gauge-able area of the probe would have to end before the elbow connector. If an elbow connector is not used, the TDR signal path would have to be more gradually curved inside the vessel being monitored, decreasing the effective gauge-able area of the probe by using a portion of the span of the vessel for gradually bending the transmission line to prevent signal loss and minimize unwanted reflections. Therefore, there is a heretofore-unmet need for an impedance matching elbow connector that is intrinsically safe in a fuel environment.

SUMMARY OF THE INVENTION

Embodiments of the present invention provide an elbow connector for a TDR vessel probe. Briefly described, the present invention is directed to a modular TDR probe assembly including a first elongated portion and a second elongated portion. The first elongated portion has a first impedance and includes a first central conductor and a first outer conductor, and the second elongated portion has a second impedance and includes a second central conductor and a second outer conductor.

The modular TDR probe assembly further includes a dielectric insert formed from a solid dielectric material having a first end, a second end, and a bore passing between the first end and the second end. The assembly includes a terminal pin formed of a conductive material having a first end and a second end. The terminal pin is configured to be disposed within the dielectric insert bore with the terminal pin first end extending from the dielectric insert first end and the terminal pin second end extending from the dielectric insert second end.

The modular TDR probe assembly also includes an elbow having a first end and a second end. The elbow is configured to substantially enclose the dielectric insert and terminal pin disposed within the elbow, wherein the elbow first end is configured to connect to the first elongated portion and thereby place the first center conductor in electrical communication with the terminal pin first end, and the elbow second end is configured to connect to the second elongated portion and thereby place the second central conductor in electrical communication with the terminal pin second end.

Briefly describe, in architecture, a second aspect of the present invention is directed to a TDR probe connector configured to connect a first coaxial probe with a second coaxial probe section. The first coaxial probe section has a first impedance and a first center conductor, and the second coaxial probe section has a second impedance and a second center conductor. The first impedance is different from the second impedance. The connector includes a substantially cylindrical outer conductor having a conductive material with a first end and a second end. The outer conductor first end is configured to connect to the first coaxial probe section, and the outer conductor second end is configured to connect to the second coaxial probe section.

The TDR probe connector further includes a dielectric insert formed of a solid dielectric material, having a first end, a second end, and a center bore passing through the dielectric insert from the dielectric insert first end to the dielectric insert second end. The dielectric insert is disposed within the outer conductor first end so that the dielectric insert substantially fills the outer conductor first end.

The TDR probe connector includes a terminal pin comprising a conductive material having a terminal pin first end and a terminal pin second end at least partially disposed within dielectric insert center bore such that the terminal pin substantially fills the dielectric insert center bore. The terminal pin first end extends past the dielectric insert first end and the terminal pin second end extends past the dielectric insert second end. The TDR probe connector also includes a spark gap, the spark gap being the shortest distance between the outer conductor and the terminal pin.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

Among other embodiments, an elbow for a TDR probe is disclosed. The elbow provides impedance matching between a first connecting section having a first impedance to a second connecting section having a second impedance. The first section transports the interrogation signal via a coaxial cable, and the second section is a coaxial waveguide. The elbow both matches impedances and minimizes reflections from the angle of connection using the geometric properties of the signal conducting elements and the impedance matching properties of a dielectric insert.

A modular TDR probe may have multiple sections. It is generally desirable for interconnecting sections to minimize reflections caused by impedance mismatches across the component connection boundary. In the case of an elbow connector, the angle of incidence between two adjacent components provides an additional source for unwanted reflections, in addition to any impedance mismatch.

Figure 2:
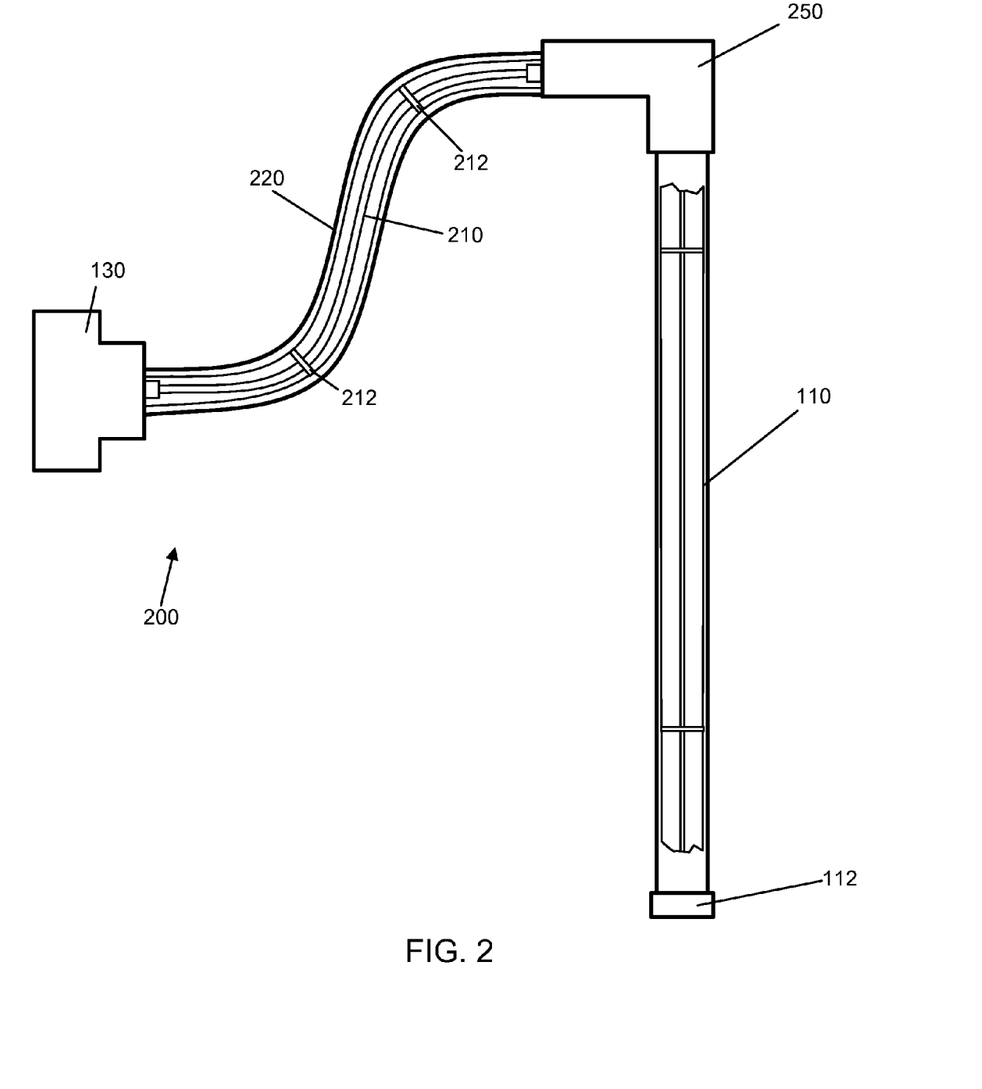
FIG. 2 is a schematic diagram of a first embodiment of a TDR probe having a hollow arm connecting section.

FIG. 2 is a partial cutaway diagram of a first embodiment of a TDR probe 200 having a hollow arm 220. The hollow arm 220, shown in a cutaway view, may connect the sensor unit 130 to an elbow 250. The elbow 250 connects the hollow arm 220 to the elongated portion 110. The elongated portion 110, shown in a partial cutaway view, has a distal end 112. The TDR probe 200 has a gauge-able area that extends from the elbow 250 to the elongated portion 110 distal end 112. The hollow arm 220 may alternatively connect the elbow 250 to a second elbow (not shown), or to another connecting element other than the sensor unit 130. In a second embodiment (FIG. 7), described below, the elbow 250 may connect the elongated portion 110 directly to the sensor unit 130, with no intervening connecting sections.

The hollow arm 220 may contain a coaxial cable 210 to conduct the interrogation signal from the sensor 130 to the elbow 250. The coaxial cable 210 may be less expensive than, for example, a dielectric filled coaxial waveguide. The hollow arm in FIG. 2 has two spacers 212 that center the coaxial cable 210 within the hollow arm 220. The spacers 212 may be made of a solid material having a known dielectric constant, for example, Teflon®. It should be noted that more or fewer spacers 212 may be used, for example, zero, one, two or more spacers 212.

Figure 3:
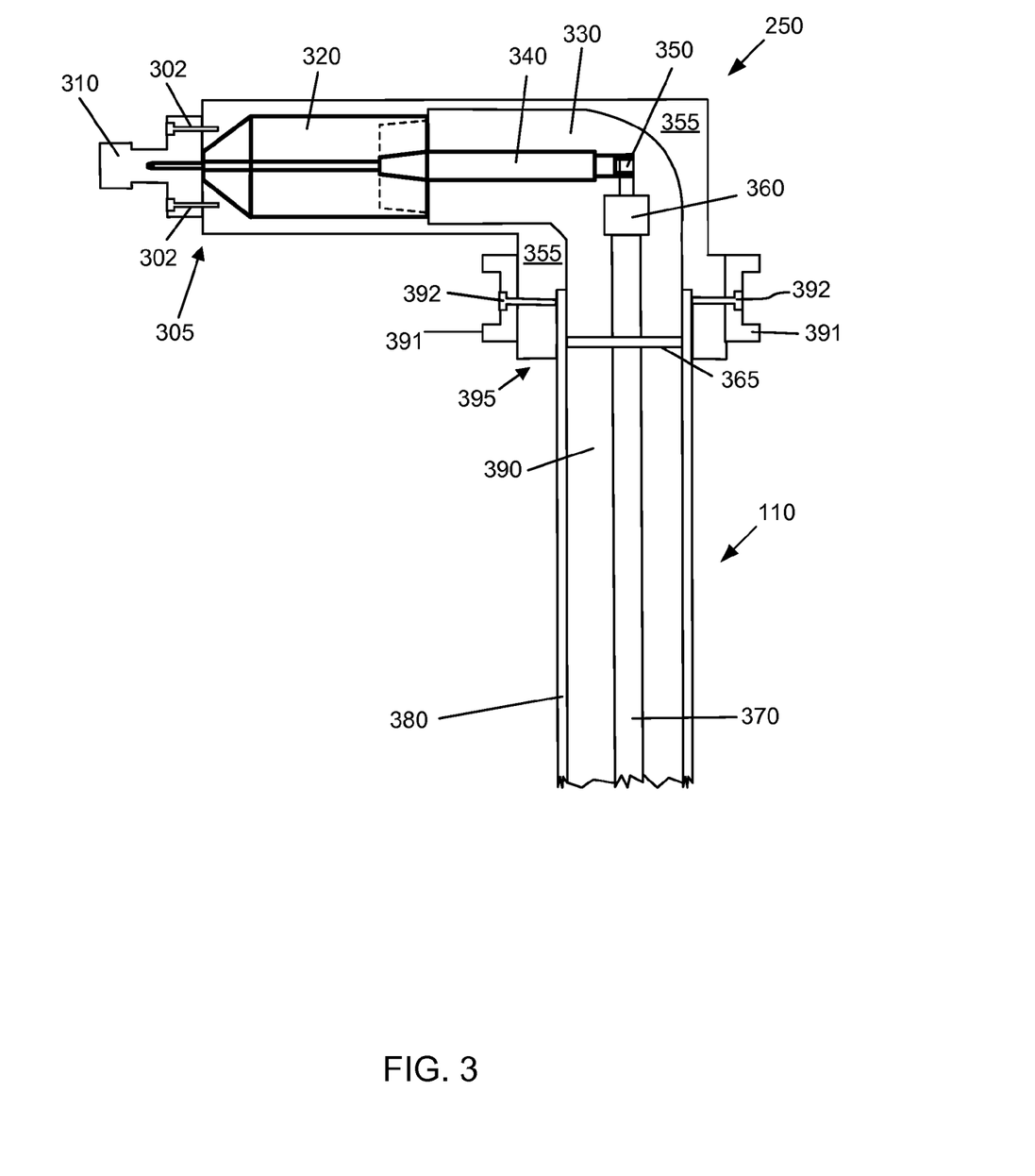
FIG. 3 is a schematic diagram of a cutaway detail of the elbow portion of the first embodiment of the probe.

FIG. 3 is a cutaway detail of the elbow 250 of the first embodiment of the TDR probe 200 and the connection between the elbow 250 and the elongated portion 110. The elbow 250 may be a single hollowed out component, or may be formed from several individual elements. The elbow 250 is generally hollow, allowing the signal path components to enter from a sensor facing portion 305, and also acting to transition the signal to a wave guide beginning within the elbow and extending through the elongated portion 110 at a probe facing portion 395. The sensor facing portion 305 may have a first impedance, for example, 50 Ohms, and the probe facing portion may have a second impedance, for example 86 Ohms. The elbow 250 acts as a coaxial wave guide, with an elbow housing 355 serving as the coaxial wave guide outer conductor. The elbow housing 355 is formed from a conducting material, and may be fashioned by machining a conducting material, for example, a solid piece of aluminum, or may be molded from a conducting material, for example, by injection molding.

The sensor facing portion 305 of the elbow 250 terminates with a coaxial cable connector 310. The probe facing portion 395 of the elbow 250 connects to the elongated portion 110. The cutaway schematic diagram in FIG. 3 shows the conductive elements of the elongated portion 110, including an outer conductor 380, and a center conductor 370. A probe hollow area 390 separates the outer conductor 380 from the center conductor 370. The probe hollow area 390 is contiguous with an elbow hollow area 330 within the elbow 250, so that the contents of the vessel, for example, fuel or air, may occupy the probe hollow area 390 and the elbow hollow area 330. The center conductor 370 is held in place by a center conductor support 365, which positions the center terminal conductor 360 at a point substantially equidistant from the outer conductor 380. The center conductor 370 ends inside the elbow 250 at center terminal conductor 360. The elbow 250 may be attached to the outer conductor 380, for example, with a collar 391 and screws 392, so that the elbow housing 355 is in electrical communication with the outer conductor 380.

Internally, the coaxial cable connector 310 attaches to a terminal pin 340. The terminal pin 340 provides the center conducting connection between the coaxial cable connector 310 and a center terminal conductor 360, whereas the elbow housing 355 serves as an outer conductor. The solder joint 350 is the connection point between the terminal pin 340 and the center terminal conductor 360. When assembled, the terminal pin 340 is inserted through a dielectric insert 320. The dielectric insert 320 is fashioned from a solid dielectric material having a known dielectric constant, such as Teflon®. The dielectric insert 320 substantially fills the sensor facing portion 395 of the elbow 250, and serves to prevent fluid ingression from the vessel, for example, fuel or air, from reaching the sensor facing portion 305 of the elbow 205. Further details of the dielectric insert 320 are disclosed below.

The impedance Z for a waveguide having an inner conductor with diameter $d_{inner}$ and an outer conductor having a diameter $d_{outer}$ is shown by $$Z = \frac{60}{\sqrt{\varepsilon}} \ln\left(\frac{d_{outer}}{d_{inner}}\right) \quad \text{(Eq. 1)}$$

where $\varepsilon$ is the dielectric constant of the material between the inner conductor and the outer conductor. The dielectric constant for air is different from the dielectric constant for fuel, so, for example, if fuel partially fills a waveguide there will be an impedance transition for a signal traversing the waveguide at the physical location where the waveguide fill changes from air to fuel. For example, TDR may be used to detect this impedance transition in a fuel probe within a fuel tank to determine the fuel level within the probe, which is assumed to correspond to the fuel level within the fuel tank.

Accordingly, the impedance within the elbow 250 may change at different locations along the elbow 250 depending upon the diameter of the inner conductor at that location, the diameter of the outer conductor at that location, and the dielectric constant of the material between the inner conductor and the outer conductor at that location. At different locations along the elbow 250 the inner conductor may be the terminal pin 340, the solder joint 350, the center terminal conductor 360, and the center conductor 370. The elbow housing 355 forms the outer conductor. The dielectric insert 320 has a known dielectric constant. The rest of the elbow 250 may be filled with, for example, air or fuel, or a first portion may be filled with air and a second portion may be filled with fuel.

As discussed previously, there may be concern regarding electromagnetic energy sparking between the inner conductor and the outer conductor along the signal path of the elbow 250. The probability of a spark arcing across the gap between the inner conductor and the outer conductor depends upon both the distance between the inner conductor and the outer conductor, and the fill material between the inner conductor and the outer conductor. For example, where the fill material is a solid dielectric, such as Teflon®, the probability of a spark is reduced compared to if the fill material is air. Similarly, the probability of a spark across a larger spark gap is less than the probability of a spark across a smaller spark gap. In general, a minimum spark gap on the order of 0.190 inches may be sufficient to prevent a spark from energy caused by a lightning strike conducted along the TDR signal path.

Figure 4:
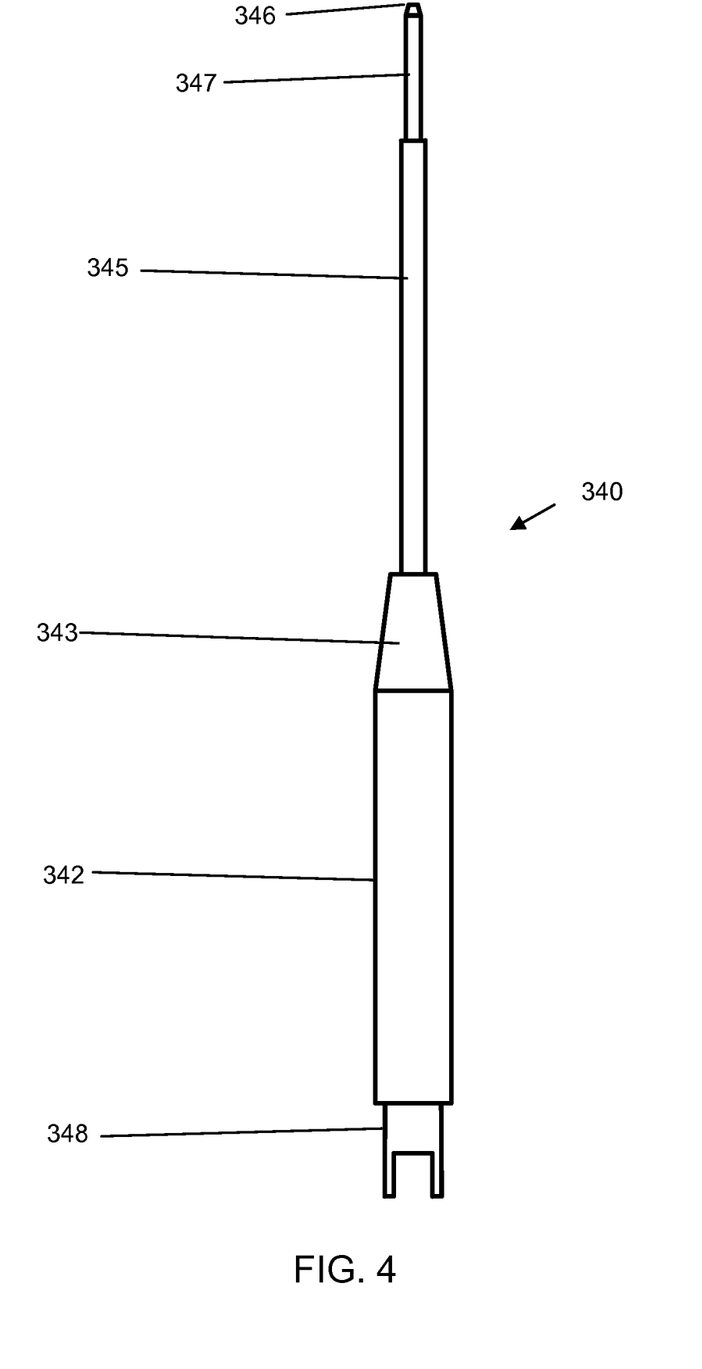
FIG. 4 is a schematic diagram of a detail of the terminal pin.

FIG. 4 is a detail of the terminal pin 340. The terminal pin 340 is formed of a conducting material, for example, nickel or aluminum. The terminal pin 340 serves as the center conductor to the outer conductor of the elbow housing 355 (FIG. 3). The terminal pin 340 has several sections. Most of the sections are generally cylindrical in shape, and the diameter of each section may be determined to minimize reflection of the interrogation pulse and to set the desired impedance at different locations within the elbow 250 (FIG. 3). The center terminal connector 348 of the terminal pin 340 connects to the center terminal conductor 360 of the elongated portion 110 (FIG. 3) at a solder joint 350 (FIG. 3). It should be noted that the solder joint may connect the center terminal connector 348 to the center terminal conductor 360 (FIG. 3) using hot solder, cold solder, or by using another connection method suitable for physically and electrically connecting conductors, as familiar to persons having ordinary skill in the art.

The terminal pin 340 joins the terminal connector 360 (FIG. 3) at an angle, the angle for example in the range of 45 degrees to 135 degrees. While the center terminal connector 348 in FIG. 4 is generally fork shaped, the center terminal connector 348 may be formed in other configurations to facilitate other connection methods to the center terminal conductor 365 (FIG. 3). The center terminal connector 348 connects to a terminal pin barrel 342. The terminal pin barrel 342 has a generally constant diameter, sized according to Eq. 1, above, with the terminal pin barrel diameter as $d_{inner}$ and the elbow housing 355 diameter as $d_{outer}$.

The terminal pin barrel 342 is adjacent to a conical section 343. The conical section has a wider radius at the terminal pin barrel 342 end and a narrower radius at the insert core 345 end. The dimensions of the conical section 343 are discussed below in relation to the dielectric insert 320 (FIG. 3). At its widest point, the diameter of the conical section 343 may be narrower than the diameter of the terminal pin barrel 342. At its narrowest point, the diameter of the conical section 343 is wider than the diameter of an insert core 345. When the terminal pin 340 is assembled with the dielectric insert 320 (FIG. 3), the conical section 343 is located generally within a rear recess 328 (FIG. 5) of the dielectric insert 320 (FIG. 3).

Figure 5:
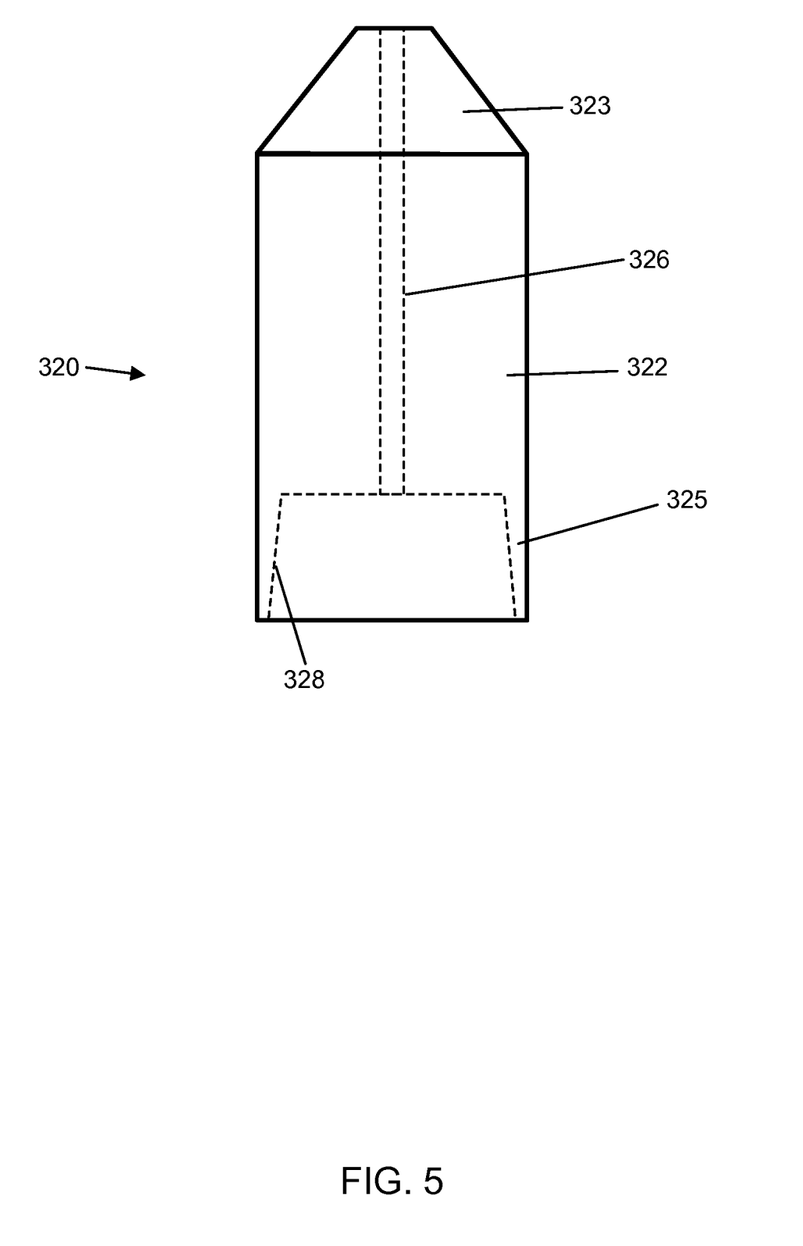
FIG. 5 is a schematic diagram of a detail of the dielectric insert.

The insert core 345 of the terminal pin 340 is adjacent to the narrow end of the conical section 343. When the terminal pin 340 is assembled with the dielectric insert 320 (FIG. 3), the insert core sits inside a center bore 326 (FIG. 5) of the dielectric insert 320 (FIG. 5). A protruding end 347 connects to the insert core 345. When the terminal pin 340 is assembled with the dielectric insert 320 (FIG. 3), the protruding end 347 extends from the end of the dielectric insert 320 (FIG. 3) and protrudes outward where it may be connected with the coaxial cable connector 310 (FIG. 3). The protruding end 347 is generally cylindrical and has a smaller diameter than the diameter of the insert core 345. The protruding end 347 terminates at chamfer 346. The chamfer 346 tapers from the diameter of the protruding end 347 so it may form an electrical connection with the coaxial cable 210 (FIG. 2) at the coaxial cable connector 310 (FIG. 3).

FIG. 5 is a schematic diagram of a detail of the dielectric insert 320. As mentioned above, the dielectric insert 320 acts to prevent ingression of liquid or gas into the sensor facing portion 305 (FIG. 3) of the elbow 250 (FIG. 3), and further provides a region within the elbow 250 having a known impedance. The impedance of the segment of the signal path traversing the dielectric insert 320 may be matched to the coaxial cable 210 (FIG. 2) to smooth the signal transition between the hollow arm 220 (FIG. 2) and the elbow 250 (FIG. 2). In addition, the presence of the solid dielectric obviates concern about sparking through the solid dielectric material across the gap between the elbow housing 355, serving as the outer conductor of a coaxial waveguide, and the terminal pin 340, serving as the center conductor of a coaxial waveguide.

The dielectric insert 320 is positioned within the sensor facing portion 305 (FIG. 3) of the elbow 250 (FIG. 3), adjacent to the elbow hollow area 330 (FIG. 3). The dielectric insert 320 may have an insert barrel 322 and a bevel section 323. The bevel section 323 tapers from a wide end, having a diameter substantially equal to the diameter of the insert barrel 322, to a narrow end toward the sensor facing portion 305 (FIG. 3) of the elbow 250 (FIG. 3). The bevel section 323 serves to reduce the area of the dielectric material adjacent to the coaxial cable connector 310 (FIG. 3), and to provide more elbow 250 (FIG. 3) surface area for attaching the coaxial cable connector 310 (FIG. 3) to the elbow 250 (FIG. 3) with coaxial cable connector screws 302. It should be noted that alternative embodiments of a dielectric insert 320 may omit the beveled section 323.

The insert barrel 322 is generally cylindrically shaped on the outer surface. Toward the probe facing end of the insert barrel 322, there is a rear recess 328. The rear recess is inset from the end of the barrel, and has a flat bottom surface and a beveled lip 325. The angle of the beveled lip 325 is substantially the same as the taper angle of the conical section 343 (FIG. 4) of the terminal pin 340 (FIG. 4). The rear recess 328 maintains a suitable spark gap to reduce the likelihood of a high energy signal from igniting inflammable gasses or liquids in the vicinity of the elbow 250 (FIG. 2). Similarly, the matching tapers of the lip 325 and the terminal pin conical section 343 allow for both reduction of reflections at the impedance transition between the dielectric insert 320 and the elbow hollow area (FIG. 3) as per Eq. 1, and setting up proper geometry to maintain the appropriate spark gap as the diameter of the terminal pin 340 increases from the insert core 345 to the terminal pin barrel 342. As described previously, an appropriate spark gap may be maintained by having a minimum spacing of approximately 0.2 inches between all inner conductors and outer conductors.

In addition, the taper on the lip 325 provides a slope to allow any accumulated fluid, for example, fuel, to drain out from the rear recess 328. The center bore 326 facilitates insertion of the insert core 345 (FIG. 4) of the terminal pin 340 (FIG. 4). The center bore starts at the rear recess 328, passes substantially through the center of the insert barrel 322 and the bevel 323.

Figure 6:
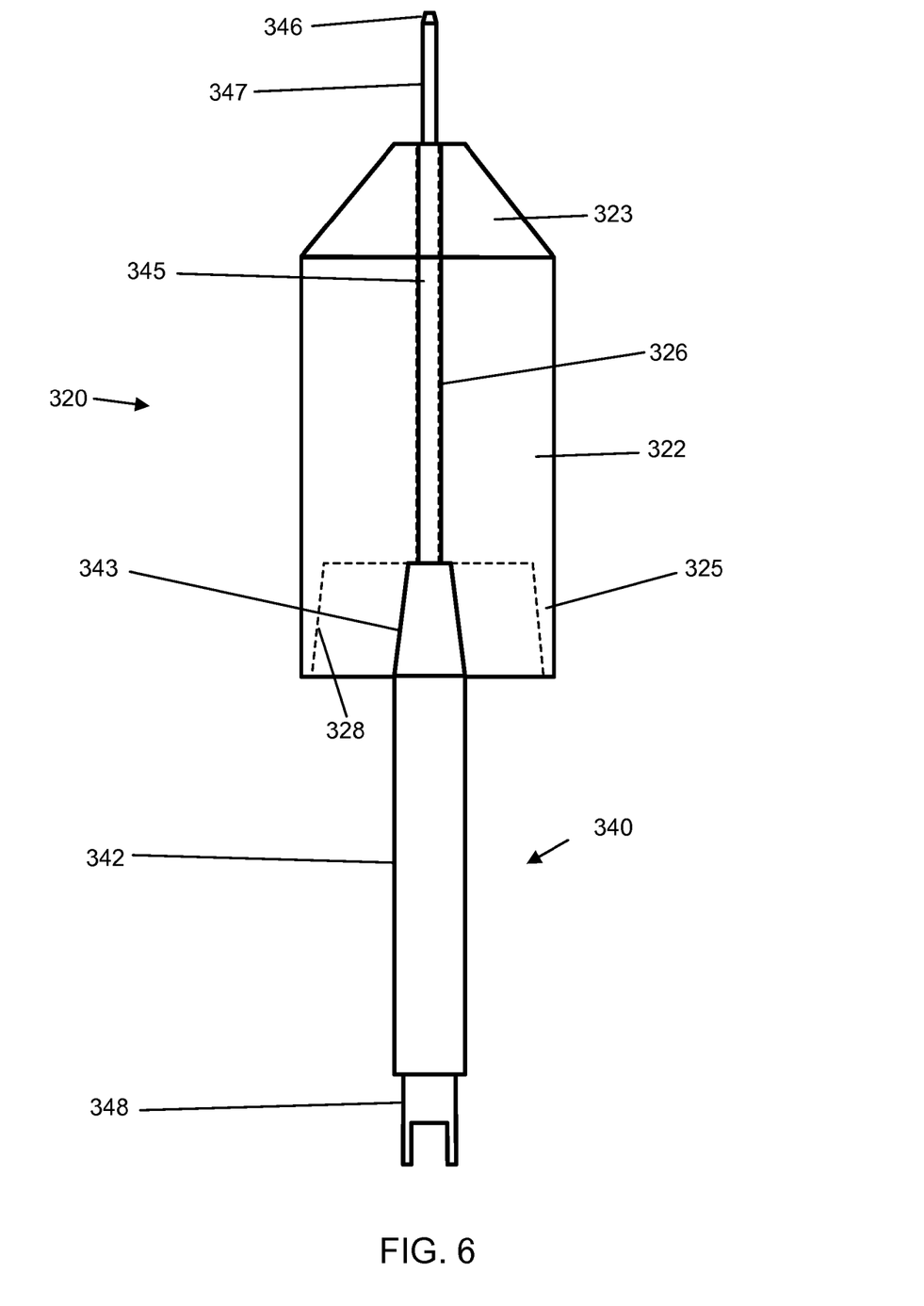
FIG. 6 is a schematic diagram of the terminal pin as inserted into the dielectric insert.

FIG. 6 shows the terminal pin 340 inserted into the dielectric insert 320 as assembled. The insert core 345 sits within the center bore 326. The center bore may be only marginally larger in diameter than the diameter of the insert core 345 to prevent fluid from entering the center bore 326 when the terminal pin 340 is inserted. The sensor facing end of the terminal pin conical section 343 abuts the surface of the dielectric insert rear recess 328. The terminal pin conical section 343 may be positioned tightly against the floor of the rear recess 328 to seal the center bore 326 against fluid. The terminal pin protruding end 347 extends outward from the dielectric insert bevel 323 toward the sensor facing end of the elbow 250 (FIG. 3). The terminal pin protruding end 347 inserts into the coaxial cable connector 310 (FIG. 3) to electrically couple the terminal pin 340 to the center conductor in the element connected to the elbow 250, for example, a hollow arm with an internal coaxial cable, or a sensor unit directly connected to the elbow.

The insert core 345 conducts the interrogation pulse through the dielectric insert 320, while the conical section 343, the terminal pin barrel 342 and the center terminal connector 348 conduct the interrogation signal through the elbow hollow area 330 (FIG. 3). An impulse reflection will generally occur at the transition between the dielectric insert 320 and the elbow hollow area 330 (FIG. 3), as the impedance of the signal path changes from a first impedance, for example, 50 Ohms matching the impedance of the coaxial cable 210 (FIG. 2) to a second impedance, for example, 86 Ohms matching the elongated portion 110 (FIG. 2). The length of the terminal pin barrel 342 may be relatively long to distinguish between first reflections of the interrogation pulse at the transition between the dielectric insert 320 and the elbow hollow area 330 (FIG. 3), from second reflections of the interrogation pulse at the angle connection at the solder joint 350 (FIG. 3). It may be similarly desirable for the terminal pin barrel 342 length to be sized based upon the shape of the interrogation pulse being generated. For example, compared to a step function with a fast rise time, an interrogation pulse having a step function with a slow rise time may cause a relatively long settling time of the reflected signal, making it difficult to distinguish between reflections from closely spaced reflection points. Therefore the specific geometry of the terminal pin 340 may be tailored to suit the type of interrogation pulse being used in the TDR system.

Figure 7:
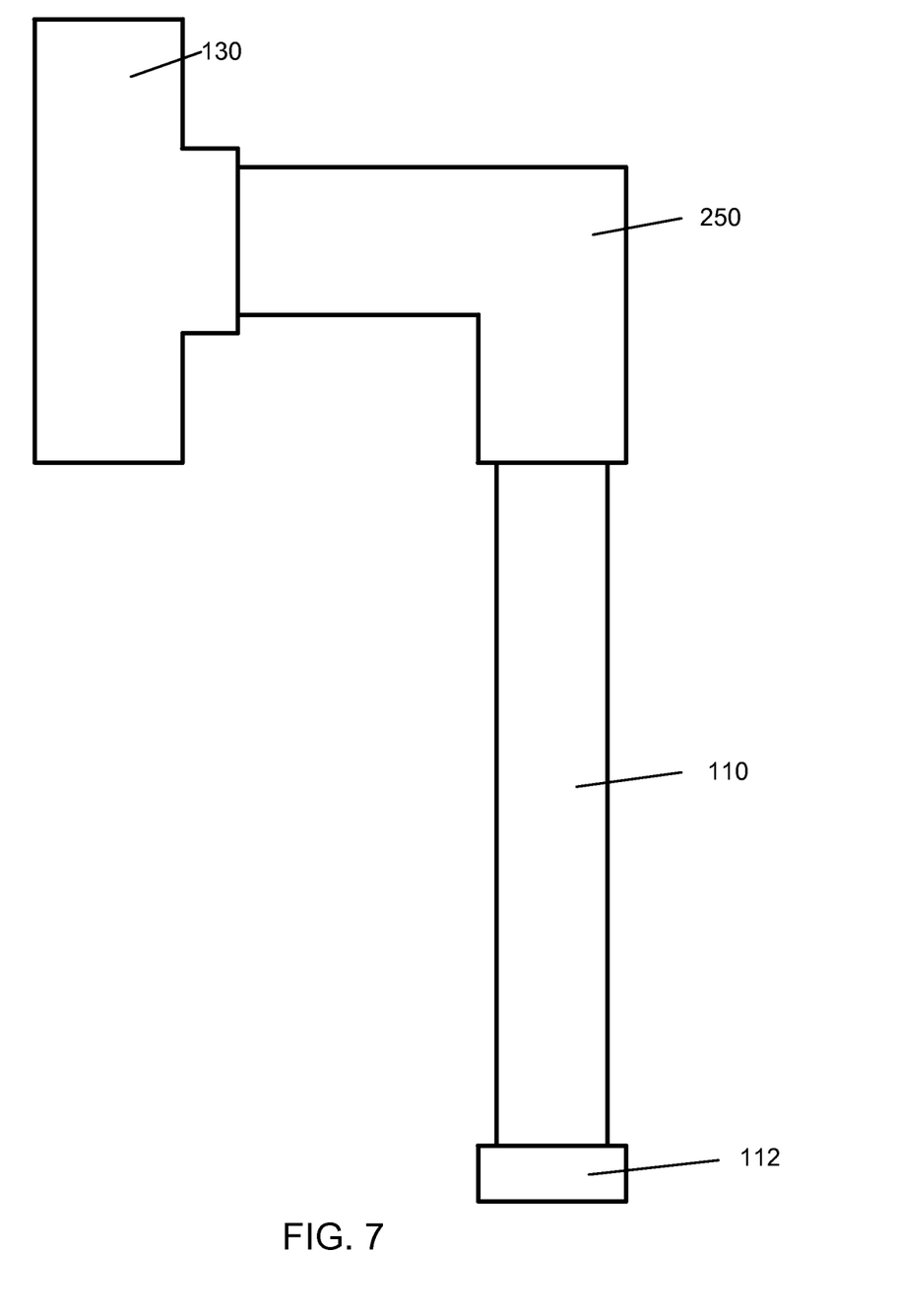
FIG. 7 is a schematic diagram of a second embodiment of a TDR probe with an elbow.

FIG. 7 shows a second embodiment of a TDR probe with an elbow 250. Under the second embodiment, the elbow 250 connects the sensor unit 130 to the elongated portion 110. In the second embodiment, the elbow 250 may internally connect to the sensor unit 130 with a coaxial connector (not shown). The elbow 250 of the second embodiment transitions the second impedance of the elongated portion 110 to the first impedance of the internal coaxial connector (not shown) at the sensor unit 130.

Figure 8:
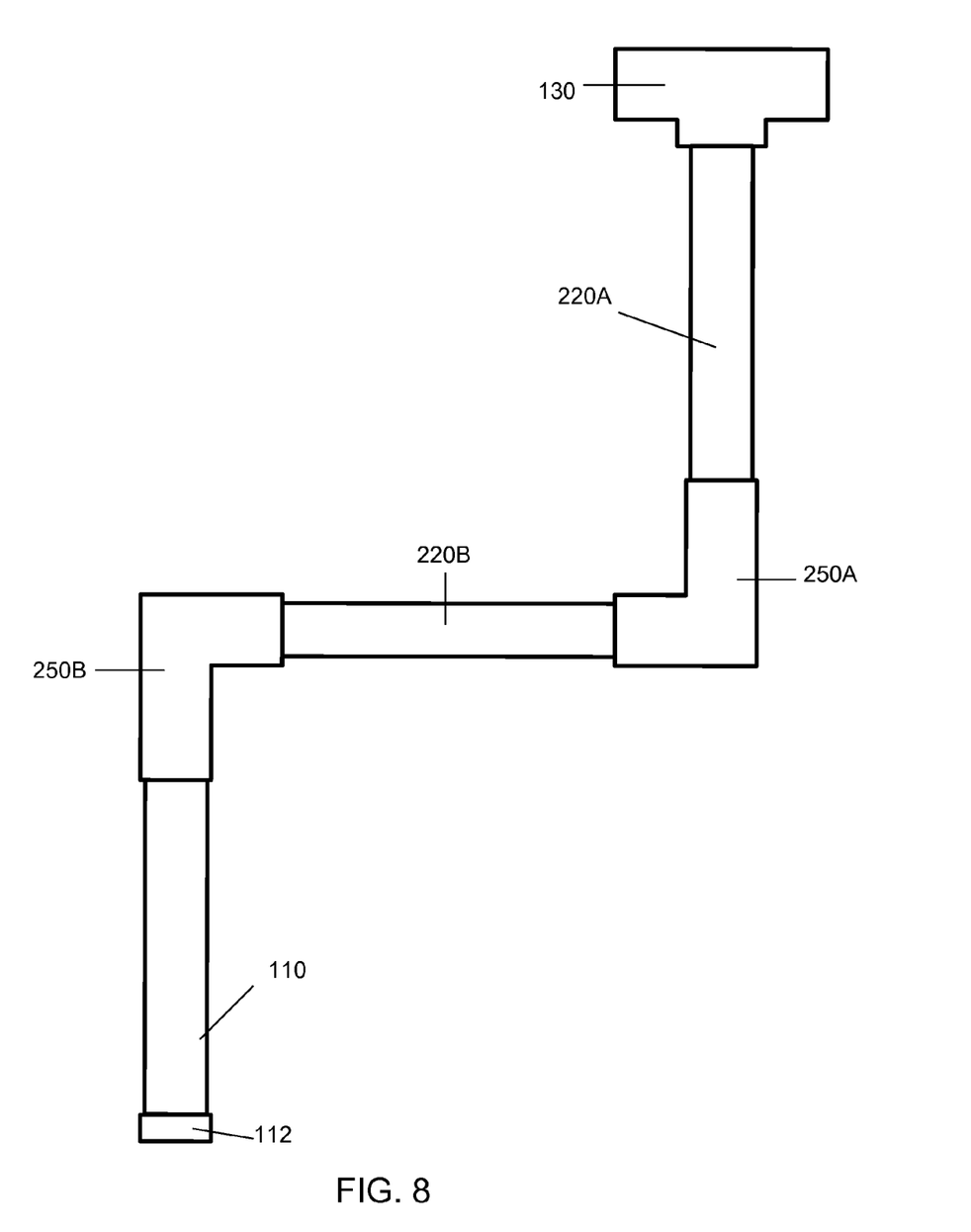
FIG. 8 is a schematic diagram of a third embodiment of a TDR probe with two elbows.

FIG. 8 shows a third embodiment of a TDR probe with two elbows 250A, 250B. A first hollow arm 220A connects the sensor 130 to a first elbow 250A. A second hollow arm 220B connects the first elbow 250A to a second elbow 250B. The second elbow 250B connects to a elongated portion 110. A probe configured with multiple hollow arms 220 and elbows 250 may be used, for example, to connect an elongated portion 110 to a sensor 130 by routing the hollow arms 220 and elbows 250 around objects or components in a confined space, for example, an aircraft wing.

It should be noted that while FIG. 8 depicts two elbows 250A, 250B that connect to hollow arms 220A, 220B and/or probes 110 at 90 degrees, there is no objection to using elbows 250 with different or dissimilar angles, for example, 80 degrees and 110 degrees. Similarly, there is no objection to a TDR probe having more than two elbows 250, for example, three, four, or more elbows 250. While arms 220 are depicted as straight, there is no objection to a curved hollow arm 220 (FIG. 2).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A modular TDR probe assembly comprising:
  a first elongated portion having a first impedance wherein the first elongated portion further comprises a first central conductor and a first outer conductor;
  a second elongated portion having a second impedance, wherein the second elongated portion further comprises a second central conductor and a second outer conductor;
  a dielectric insert comprising a solid dielectric material, a dielectric insert first end, a dielectric insert second end, and a bore passing through the dielectric insert between the first end and the second end;
  a terminal pin comprising a conductive material having a terminal pin first end and a terminal pin second end configured to be disposed at least partially within the dielectric insert bore with the terminal pin first end extending from the dielectric insert first end and the terminal pin second end extending from the dielectric insert second end; and
  an elbow comprising a first end and a second end configured to substantially enclose the dielectric insert and terminal pin disposed within the elbow, wherein the elbow first end is configured to connect to the first elongated portion and thereby place the first center conductor in electrical communication with the terminal pin first end, and the elbow second end is configured to connect to the second elongated portion and thereby place the second central conductor in electrical communication with the terminal pin second end.

2. The TDR probe assembly of claim 1 wherein the elbow joins the first elongated portion at an angle in the inclusive range of 45 degrees and 135 degrees relative to the second elongated portion.

3. The TDR probe assembly of claim 1, wherein the elbow first end is configured to connect to the first elongated portion with a coaxial connector.

4. The TDR probe assembly of claim 1, wherein the central conductor and outer conductor of the first elongated portion comprise a coaxial cable.

5. The TDR probe assembly of claim 1, wherein the dielectric insert further comprises a central bore passing through the dielectric insert.

6. The TDR probe assembly of claim 5, wherein the dielectric insert further comprises:
  a substantially cylindrical barrel section further comprising a barrel section diameter, a first end and a second end; and
  a recess area in the barrel section second end.

7. The TDR probe assembly of claim 6, wherein the dielectric insert further comprises a substantially conical beveled section further comprising a narrow end having a minimum diameter and a wide end having a maximum diameter equal to the barrel section diameter, and the dielectric insert conical beveled section wide end disposed adjacent to the dielectric insert cylindrical barrel section first end.

8. The TDR probe assembly of claim 7, wherein the terminal pin further comprises:
- an insert section configured to be disposed substantially within the dielectric insert center bore;
- a terminal pin conical section configured to be disposed substantially within the dielectric insert cylindrical section recess area, the conical section having a minimum diameter and a maximum diameter, the minimum diameter portion of the terminal pin conical section disposed to be adjacent to the insert section;
- a terminal pin barrel section adjacent to the maximum diameter portion of the conical section, the barrel section having a diameter at least as large the conical section maximum diameter; and
- a connector adjacent to the terminal pin barrel section.

9. The TDR probe assembly of claim 1, wherein the second elongated portion further comprises an end cap.

10. The TDR probe assembly of claim 9, wherein the end cap attaches to the second elongated portion by one of: a snap on connector, connector pins, or a threaded screw on connector.

11. A TDR probe connector configured to connect a first coaxial probe with a second coaxial probe section, the first coaxial probe section having a first impedance and a first center conductor, the second coaxial probe section having a second impedance and a second center conductor, the second impedance being different from the first impedance, the connector comprising:
- a substantially cylindrical outer conductor comprising a conductive material having an outer conductor first end and an outer conductor second end wherein the outer conductor first end is configured to connect to the first coaxial probe section, and the outer conductor second end is configured to connect to the second coaxial probe section;
- a dielectric insert comprising a solid dielectric material, a dielectric insert first end, a dielectric insert second end, and a center bore passing through the dielectric insert from the dielectric insert first end to the dielectric insert second end, the dielectric insert disposed within the outer conductor first end such that the dielectric insert substantially fills the outer conductor first end;
- a terminal pin comprising a conductive material having a terminal pin first end and a terminal pin second end at least partially disposed within dielectric insert center bore such that the terminal pin substantially fills the dielectric insert center bore, the terminal pin first end extending past the dielectric insert first end and the terminal pin second end extending past the dielectric insert second end; and
- a first spark gap comprising the shortest distance between the outer conductor and the terminal pin.

12. The connector of claim 11, wherein the connector is further configured to place the first center conductor in electrical communication with the terminal pin first end at a first connection point, and the connector is configured to place the second central conductor in electrical communication with the terminal pin second end at a second connection point.

13. The connector of claim 11, wherein the first spark gap is greater than 0.190 inches.

14. The connector of claim 11, further comprising an elbow disposed between the outer conductor first end and the outer conductor second end, wherein the elbow further comprises an elbow angle between the outer conductor first end and the outer conductor second end.

15. The connector of claim 14, wherein the second connection point is disposed substantially within the elbow.

16. The connector of claim 15, further comprising a second spark gap, the second spark gap comprising the shortest distance between the outer conductor and the second central conductor, and wherein the second spark gap is greater than 0.190 inches.

17. The connector of claim 15, further comprising a connection angle between the terminal pin and the second central conductor at the second connection point, wherein the connection angle is substantially equal to the elbow angle.

18. The connector of claim 17, wherein the elbow angle is in the inclusive range from 45 degrees to 135 degrees.

* * * * *